(12) United States Patent
Han et al.

(10) Patent No.: US 11,314,268 B2
(45) Date of Patent: Apr. 26, 2022

(54) ELECTRONIC DEVICE THAT REMOVES ACOUSTIC NOISE BASED ON FREQUENCY BOOSTER

(71) Applicant: SAMSUNG ELECTRONICS CO., LTD., Suwon-si (KR)

(72) Inventors: Sang-Il Han, Seoul (KR); Ji-Hong Kim, Seongnamj-si (KR); Kwan-Bin Yim, Yongin-si (KR); Young-Min Kim, Seongnam-si (KR); Han-Jae Lee, Gimpo-si (KR); Su-Il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 16/711,292

(22) Filed: Dec. 11, 2019

(65) Prior Publication Data
US 2020/0209903 A1    Jul. 2, 2020

(30) Foreign Application Priority Data
Dec. 31, 2018   (KR) ........................ 10-2018-0174220

(51) Int. Cl.
| | |
|---|---|
| *H02M 3/158* | (2006.01) |
| *G05F 1/575* | (2006.01) |
| *H02M 3/157* | (2006.01) |
| *H02M 1/084* | (2006.01) |
| *H02M 3/335* | (2006.01) |
| *H02M 1/00* | (2006.01) |

(52) U.S. Cl.
CPC .......... *G05F 1/575* (2013.01); *H02M 1/0038* (2021.05); *H02M 1/0845* (2013.01); *H02M 3/157* (2013.01); *H02M 3/158* (2013.01); *H02M 3/33515* (2013.01); *H02M 1/0009* (2021.05); *H02M 1/0032* (2021.05)

(58) Field of Classification Search
CPC ............... H02M 3/158; H02M 1/0032; H02M 3/33515; H02M 1/0009
See application file for complete search history.

(56) References Cited

U.S. PATENT DOCUMENTS

| | | | |
|---|---|---|---|
| 8,564,966 B2 | 10/2013 | Kitagawa et al. | |
| 8,675,891 B2 | 3/2014 | Odaohhara et al. | |
| 2010/0202175 A1 | 8/2010 | Balakrishnan et al. | |
| 2012/0320486 A1* | 12/2012 | Lagree ................. | H02H 1/0023 361/115 |

(Continued)

*Primary Examiner* — Adolf D Berhane
*Assistant Examiner* — Afework S Demisse
(74) *Attorney, Agent, or Firm* — Volentine, Whitt & Francos, PLLC

(57) ABSTRACT

An electronic device includes: a switching regulator configured to generate a conversion voltage with respect to an input voltage, based on a switching signal of a first frequency, and output the conversion voltage; a stabilization circuit including a capacitor element connected to a load device via a first node and configured to generate a load voltage by stabilizing the conversion voltage by using the capacitor element and output the load voltage to the load device; a frequency sensing circuit configured to sense a frequency of the load voltage and output sensing information about the frequency of the load voltage; and a frequency booster circuit configured to form a first current path connected to the first node, based on the sensing information.

20 Claims, 14 Drawing Sheets

(56) References Cited

U.S. PATENT DOCUMENTS

| | | |
|---|---|---|
| 2014/0307889 A1 | 10/2014 | Hardell |
| 2015/0115813 A1 | 4/2015 | Hussain et al. |
| 2016/0020041 A1 | 1/2016 | Ahn et al. |
| 2016/0056712 A1 | 2/2016 | Chen et al. |
| 2016/0363952 A1 | 12/2016 | Garrone et al. |
| 2017/0269139 A1* | 9/2017 | Schmalz .............. H02H 1/0015 |
| 2018/0262114 A1 | 9/2018 | Balakrishnan et al. |
| 2018/0351505 A1* | 12/2018 | Balog, Jr ............... H02H 7/205 |

* cited by examiner

ELECTRONIC DEVICE THAT REMOVES ACOUSTIC NOISE BASED ON FREQUENCY BOOSTER

CROSS-REFERENCE TO RELATED APPLICATION

This application claims the benefit of Korean Patent Application No. 10-2018-0174220, filed on Dec. 31, 2018, in the Korean Intellectual Property Office, the disclosure of which is incorporated herein in its entirety by reference.

BACKGROUND

The disclosure relates to an electronic device, and more particularly, to an electronic device that removes acoustic noise based on a frequency booster.

Examples of an electronic component that uses a ceramic material are a capacitor, an inductor, a piezoelectric element, a varistor, and a thermistor. Among these, the capacitor is a device storing electric capacity as electric potential energy. A multilayer ceramic capacitor (MLCC), one of the ceramic electronic components, is a typical type of capacitor that stores charges and removes noise in an electronic circuit. An MLCC is a chip-type capacitor that is mounted in a circuit board of various electronic products such as an imaging device including a liquid crystal display (LCD) and a plasma display device panel, a computer, a mobile device, or the like, and charges or discharges a voltage. In the MLCC, acoustic noise of mechanical vibration occurring due to piezoelectric characteristics is generated.

SUMMARY

The disclosure provides an electronic device including a multilayer ceramic capacitor, which is configured to attenuate acoustic noise due to intrinsic physical characteristics of the multilayer ceramic capacitor.

According to an aspect of the disclosure, there is provided an electronic device including: a switching regulator configured to generate a conversion voltage with respect to an input voltage, based on a switching signal of a first frequency, and output the conversion voltage; a stabilization circuit including a capacitor element connected to a load device via a first node and configured to generate a load voltage by stabilizing the conversion voltage by using the capacitor element and output the load voltage to the load device; a frequency sensing circuit configured to sense a frequency of the load voltage and output sensing information about the frequency of the load voltage; and a frequency booster circuit configured to form a first current path connected to the first node, based on the sensing information.

According to another aspect of the disclosure, there is provided an electronic device including: a voltage regulator including a first terminal and a second terminal and configured to generate a switching signal having a frequency that is variable based on a feedback voltage received via the second terminal and an output voltage based on an input voltage; a stabilization circuit that is connected to the first terminal, includes a multilayer ceramic capacitor, and is configured to output a load voltage to a first node by charging or discharging the output voltage to or from the multilayer ceramic capacitor; and a frequency booster circuit that is connected to the first node and includes a frequency booster switch, wherein turning-on or turning-off the frequency booster switch is controlled based on a frequency of the load voltage.

According to another aspect of the disclosure, there is provided an electronic device including: a load device connected to a first node; a voltage regulator configured to generate a switching signal and generate an output voltage based on the switching signal and an input voltage; a multilayer ceramic capacitor having a first end connected to the first node, the multilayer ceramic capacitor being configured to generate a load voltage by being charged or discharged based on the output voltage; a frequency controller configured to output a booster control signal based on a frequency of the load voltage; and a frequency booster circuit connected to the first node and configured to form a first current path connected to the first node, based on the booster control signal.

According to another aspect of the disclosure, there is provided an electronic device including a voltage regulator and a control circuit. The voltage regulator generates a voltage whose amplitude varies at a frequency determined by current drawn from the voltage regulator. The control circuit varies the current drawn from the voltage regulator based on the frequency.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

The disclosure will now be described more fully with reference to the accompanying drawings, in which exemplary embodiments of the disclosure are shown.

Figure 1:
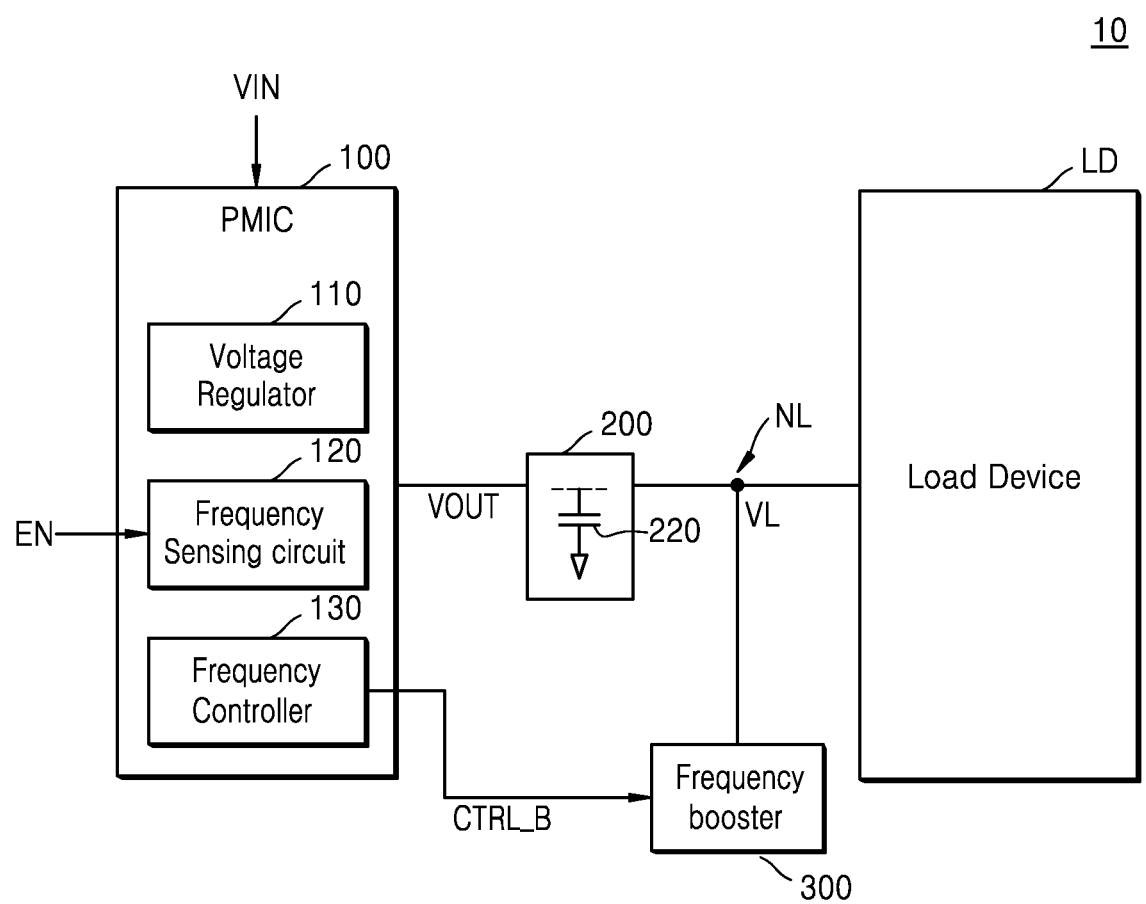
FIG. 1 is a block diagram illustrating an electronic device according to an embodiment of the disclosure.

FIG. 1 is a block diagram illustrating an electronic device 10 according to an embodiment of the disclosure. Referring to FIG. 1, the electronic device 10 may include a power management integrated circuit (PMIC) 100, a stabilization circuit 200, a frequency booster circuit 300, and a load device LD. The stabilization circuit 200 may be connected between the PMIC 100 and the load device LD, and the stabilization circuit 200, the frequency booster circuit 300, and the load device LD may be connected to each other via a first node NL.

The electronic device 10 may refer to any electronic device performing various operations based on an input voltage VIN supplied from an external power source or an internal power source (for example, a battery). The electronic device 10 may be, without limitation, a portable device such as a mobile phone, a laptop computer, a wearable device, a portable media player, a tablet PC, or an e-book reader, or a stationary device such as a desktop computer, a server, a television set-top box, a video game console, or the like.

For example, the load device LD included in the electronic device 10 may be a system on chip (SoC) that performs various operations based on power output from the PMIC 100 based on an input voltage VIN. An SoC may include a processor, a memory, and any number of functional blocks. For example, the load device LD may include a microprocessor, an application specific integrated circuit (ASIC), or a field programmable gate array (FPGA). As an example, the load device LD may be a co-processor designed to perform certain functions or related functions such as graphics processing, audio processing, or wireless communication.

The PMIC 100 may receive an input voltage VIN from an external power source or an internal power source and may provide various levels of operating voltages to the load device LD according to power management information. The PMIC 100 may include registers (not shown) storing power management information. For example, the power management information may be different according to a power management mode (e.g., normal mode, sleep mode, low power mode). In addition, power management information may also be provided from the load device LD.

The stabilization circuit 200 may generate a load voltage VL by stabilizing an output voltage VOUT generated from the PMIC 100 and output the load voltage VL to the load device LD. The stabilization circuit 200 may include a capacitor element 220 and use the capacitor element 220 to stabilize the output voltage VOUT. In an embodiment, the capacitor element 220 may include a Multilayer Ceramic Capacitor (MLCC).

As illustrated in FIG. 1, the PMIC 100 may include a voltage regulator 110, a frequency sensing circuit 120, and a frequency controller 130. The voltage regulator 110 may generate an output voltage VOUT by converting a received input voltage VIN.

In an embodiment, the voltage regulator 110 may be a switching regulator that converts an input voltage VIN based on a switching signal having a certain frequency. The voltage regulator 110 may include a switch-mode power supply (SMPS) including one or more switches. For example, the voltage regulator 110 may include a DC-DC converter including at least one converter structure from among a buck converter, a boost converter, a buck-boost converter, a flyback converter, and a forward converter.

In an embodiment, the voltage regulator 110 may receive a feedback voltage formed based on a load voltage VL and adjust a switching frequency based on the feedback voltage.

For example, the voltage regulator 110 may output a pulse signal as a switching signal based on a pulse frequency modulation (PFM) method. However, the disclosure is not limited thereto, and the voltage regulator 110 may also output a switching signal based on a pulse width modulation (PWM) method.

The frequency sensing circuit 120 may sense a frequency of a load voltage VL applied to the load device LD and may output frequency sensing information according to that sensed frequency. For example, frequency sensing information output from the frequency sensing circuit 120 may be a basis of a booster control signal CTRL_B for operational control of the frequency booster circuit 300.

According to an embodiment, the frequency sensing circuit 120 may perform a frequency sensing operation according to an enable signal EN output from a measurement device (not shown) that has measured whether noise is generated in the capacitor element 220. For example, the capacitor element 220 may include a multilayer ceramic capacitor, and the measurement device (not shown) may measure whether acoustic noise is generated in the multilayer ceramic capacitor. When acoustic noise is generated, the measurement device (not shown) may activate an enable signal EN, and the frequency sensing circuit 120 may perform a frequency sensing operation based on the activated enable signal EN. For example, the measurement device (not shown) may be included in the load device LD, but is not limited thereto.

The frequency controller 130 may receive frequency sensing information from the frequency sensing circuit 120 and may output, based on the frequency sensing information, a booster control signal CTRL_B controlling the frequency booster circuit 300. According to an embodiment, when a frequency of a load voltage VL based on frequency sensing information is within an audio frequency band, the frequency controller 130 may output a booster control signal CTRL_B such that the frequency booster circuit 300 forms a current path connected to the first node NL. The audio frequency band may be, for example, from about 20 Hz to about 20 kHz. However, the audio frequency band is not limited thereto, and may be modified in various manners, as is obvious to one of ordinary skill in the art.

According to an embodiment, the frequency controller 130 may be a memory storing a setting value of the booster control signal CTRL_B based on frequency sensing information. According to another embodiment, the frequency controller 130 may be a circuit that dynamically varies a booster control signal CTRL_B based on frequency sensing information and outputs the signal.

The frequency booster circuit 300 may be connected to the first node NL and may operate based on the booster control signal CTRL_B. According to an embodiment, the frequency booster circuit 300 may form a current path connected to the first node NL based on a booster control signal CTRL_B. For example, the frequency booster circuit 300 may include a resistance element connected to the first node NL and a frequency booster switch connected to the resistive element. Turning-on or turning-off the frequency booster switch included in the frequency booster circuit 300 may be controlled based on a booster control signal CTRL_B.

For example, when the capacitor element 220 includes a multilayer ceramic capacitor, and a frequency of a load voltage VL and a natural frequency of the multilayer ceramic capacitor resonate with each other, the frequency booster circuit 300 may form a current path connected to the first node NL, based on a booster control signal CTRL_B.

Accordingly, a current flowing from the stabilization circuit 200 to the first node NL may increase slightly and the voltage regulator 110 that has fed back the current may generate an output voltage VOUT according to a varied switching frequency. Accordingly, a frequency of the load voltage VL may be controlled to be different from the natural frequency of the multilayer ceramic capacitor.

For example, when a load voltage VL having a frequency within an audio frequency band is resonated with a natural frequency of a multilayer ceramic capacitor, acoustic noise may be generated based on intrinsic piezo-electric characteristics of the multilayer ceramic capacitor. The electronic device according to the disclosure may easily attenuate the acoustic noise by controlling a frequency of the load voltage VL to be different from a natural frequency of a multilayer ceramic capacitor according to the control by the frequency booster circuit 300. Accordingly, the inconvenience caused to a user of the electronic device 10 due to noise or the like may be reduced.

While the frequency sensing circuit 120 and the frequency controller 130 are described as being included in the PMIC 100 in the present embodiment, the disclosure is not limited thereto. According to another embodiment, at least one of the frequency sensing circuit 120 and the frequency controller 130 may be included as a separate component from the PMIC 100. In addition, while the frequency booster circuit 300 in the present embodiment is described as a separate component from the PMIC 100, according to another embodiment, the frequency booster circuit 300 may also be implemented as a component included in the PMIC 100.

Figure 2:
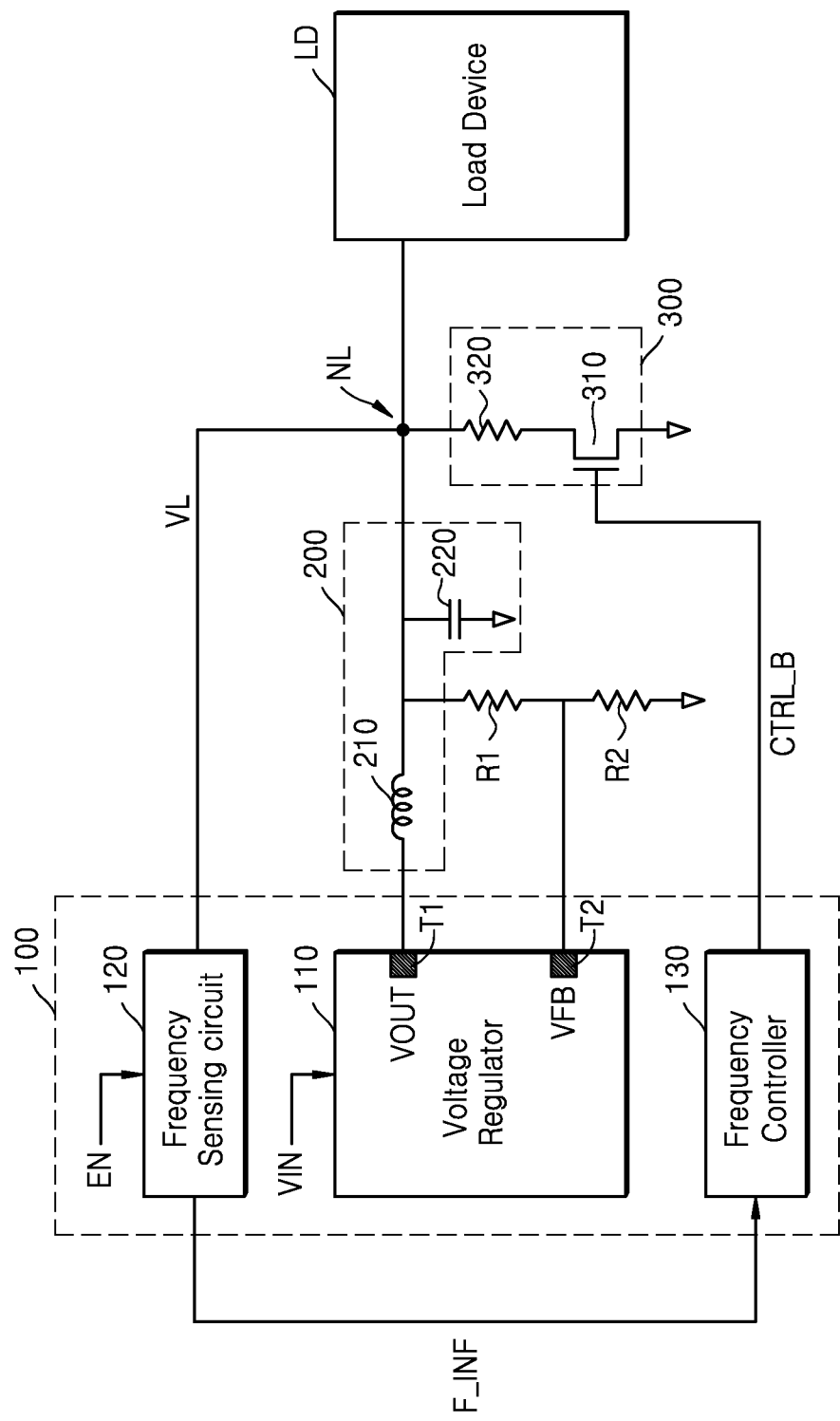
FIG. 2 is a diagram for describing an operation of an electronic device according to an embodiment of the disclosure.

FIG. 2 is a diagram for describing an operation of an electronic device according to an embodiment of the disclosure.

Referring to FIG. 2, the voltage regulator 110 may provide an output voltage VOUT through a first terminal T1, and a feedback voltage VFB through a second terminal T2. The first terminal T1 may be connected to the stabilization circuit 200, and the second terminal T2 may be connected to a first end of a first resistor R1 and a first end of a second resistor R2.

The stabilization circuit 200 may include an inductor 210 and a capacitor element 220. A first end of the inductor 210 may be connected to the first terminal T1, and a second end of the inductor 210 may be connected to a first node NL. In addition, a first end of the capacitor element 220 may be connected to the first node NL and a second end thereof may be connected to ground.

The first resistor R1 and the second resistor R2 may form a feedback path of a load voltage VL of the voltage regulator 110. A first end of the first resistor R1 may be connected to the first node NL, and a second end thereof may be connected to the second terminal T2. In addition, a first end of the second resistor R2 may be connected to the second terminal T2 and a second end thereof may be connected to ground. Accordingly, a feedback voltage VFB input via the second terminal T2 may be formed as a load voltage VL is distributed via the first resistor R1 and the second resistor R2.

According to an embodiment, the frequency booster circuit 300 may include a frequency booster switch 310 and a resistive element 320. The frequency booster switch 310 is a transistor having a first end to which ground is connected and a second end to which the resistive element 320 is connected, and the frequency controller 130 may be connected to a gate end of the frequency booster switch 310. A first end of the resistive element 320 may be connected to the frequency booster switch 310, and a second end of the resistive element 320 may be connected to the first node NL.

The frequency sensing circuit 120 may perform a frequency sensing operation based on an enable signal EN. According to an embodiment, the enable signal EN may be output from a measurement device (not shown) that has measured acoustic noise of the capacitor element 220. For example, the capacitor element 220 may include a multilayer ceramic capacitor, and as a frequency of the load voltage VL is resonated with a natural frequency of the multilayer ceramic capacitor within an audio frequency band, acoustic noise may be measured. A resonance frequency may include one or more harmonic components. Accordingly, as the measurement device activates the enable signal EN, and in response to the activated enable signal EN, the frequency sensing circuit 120 may sense a frequency of the load voltage VL.

The frequency sensing circuit 120 may output frequency sensing information F_INF generated according to the sensing, to the frequency controller 130. The frequency controller 130 may output a booster control signal CTRL_B applied to the gate end of the frequency booster switch 310, based on the frequency sensing information F_INF.

According to an embodiment, as the frequency booster switch 310 is turned on by receiving a booster control signal CTRL_B, a current path may be formed between the first node NL and ground. In other words, based on the control by the booster control signal CTRL_B, a current path including the resistive element 320 and the frequency booster switch 310 may be formed.

As the current path is formed while a frequency of the load voltage VL and a natural frequency of the multilayer ceramic capacitor resonate with each other, a load shown at the first node NL may become greater than a load of the load device LD. A variation in a current and a voltage according to the current path of the frequency booster circuit 300 may be transmitted to the voltage regulator 110 via a feedback path including the first and second resistors R1 and R2. According to an embodiment, the voltage regulator 110 may include a switching controller and may generate an output voltage VOUT by using a frequency varied according to the control by the switching controller based on a feedback voltage VFB. The varied frequency may be a value between resonance frequencies and may refer to a minimum frequency (or a minimum load) at which resonance may be avoided. Accordingly, a frequency of the load voltage VL may be controlled to be different from a natural frequency of the capacitor element 220.

Figure 3A:
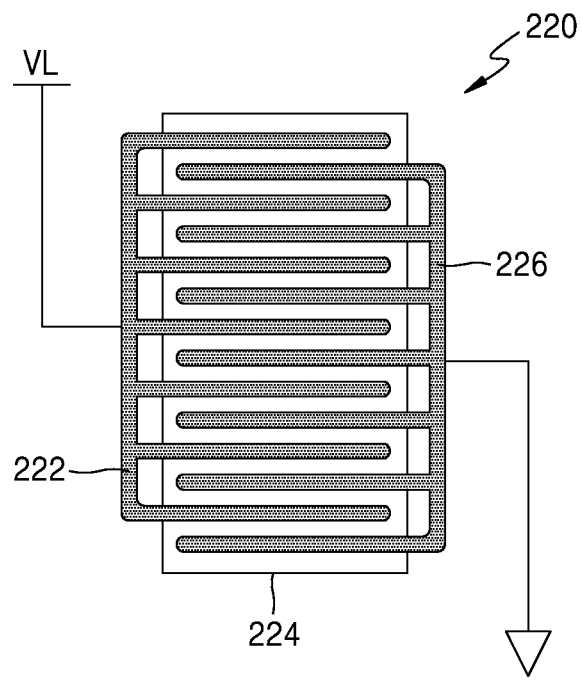
FIGS. 3A through 3C are diagrams for describing an example of a capacitor element according to an embodiment of the disclosure.
Figure 3B:
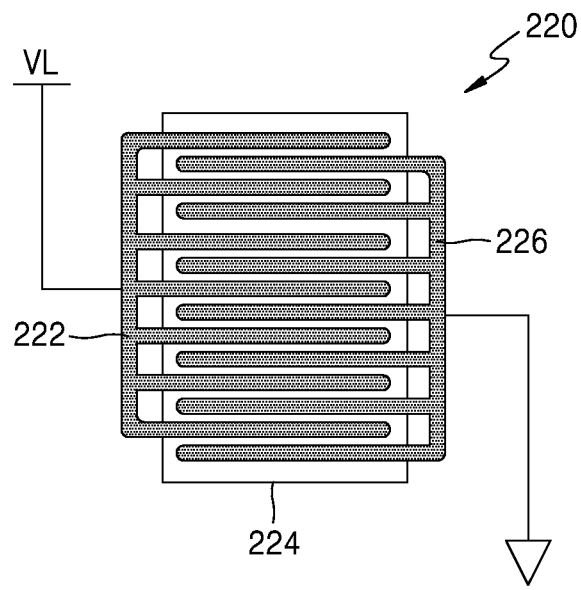
Figure 3C:
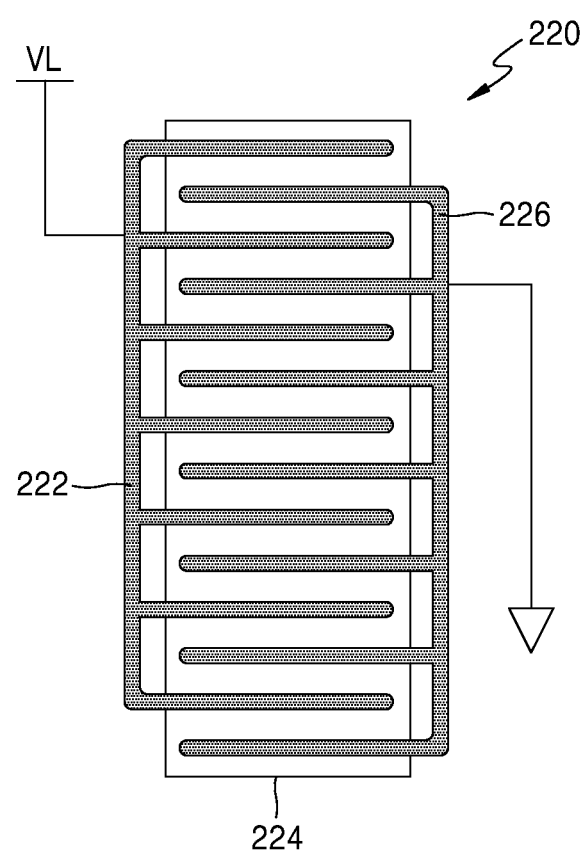

FIGS. 3A through 3C are diagrams for describing an example of the capacitor element 220 according to an embodiment of the disclosure. For example, the capacitor element 220 of FIGS. 3A through 3C may be a multilayer ceramic capacitor.

Referring to FIG. 3A, the capacitor element 220 may include a first conductor 222, to which a load voltage VL is applied, a dielectric 224, and a second conductor 226 connected to ground. The first conductor 222 and the second conductor 226 may be separated from each other via the dielectric 224. For example, to the capacitor element 220 illustrated in FIG. 3A, a nominal voltage is applied as a load voltage VL.

The first and second conductors 222 and 226 may each include a plurality of metal layers separated by the dielectric 224. Metal layers constituting the first conductor 222 may be interconnected on an end portion of the capacitor element 220, and metal layers constituting the second conductor 226 may be interconnected on the opposite end portion of the capacitor element 220. The metal layers may be alternately arranged between the first and second conductors 222 and 226. In the present embodiment, while seven metal layers included in each of the first and second conductors 222 and 226 are illustrated, the number of metal layers is provided for convenience of description, and may be more or less than the illustrated ones. For example, the number of metal layers may be one factor that determines a capacitance value of the capacitor element 220.

The dielectric 224 may be formed of a non-conductor material such as ceramic (for example, barium titanate or titanium oxide). At least one of additives such as barium titanate, aluminum silicate, magnesium silicate, titanium oxide, manganese, and zirconium may be used as a material of the dielectric 224 to adjust some of the characteristics of the capacitor element 220. As illustrated in FIG. 3A, the dielectric 224 may have a uniform thickness between the first and second conductors 222 and 226 when an applied voltage (load voltage VL) is stable.

FIG. 3B illustrates the capacitor element 220 when the applied load voltage VL drops from the nominal voltage by a preset voltage. Referring to FIG. 3B, when a voltage (load voltage VL) applied to the capacitor element 220 drops from the nominal voltage by a preset voltage, the dielectric 224 may shrink. Accordingly, a thickness of the dielectric 224 formed between the first and second conductors 222 and 226 may be reduced. A center of mass of the dielectric 224 may be shifted as the dielectric 224 shrinks, and this physical force may be transmitted to a circuit board to which the capacitor element 220 may be attached.

FIG. 3C illustrates the capacitor element 220 when the applied load voltage VL increases from the nominal voltage by a preset voltage. Referring to FIG. 3C, when a voltage (load voltage VL) applied to the capacitor element 220 increases from the nominal voltage by a preset voltage, the dielectric 224 may expand. Accordingly, a thickness of the dielectric 224 formed between the first and second conductors 222 and 226 may be increased. A center of mass of the dielectric 224 may be shifted as the dielectric 224 expands, and this physical force may be transmitted to a circuit board to which the capacitor element 220 may be attached.

As described above, when the capacitor element 220 includes a multilayer ceramic capacitor and a switching voltage is applied to the capacitor element 220, a periodic change in a voltage may cause the capacitor element 220 to vibrate by expanding or shrinking, thickness-wise, the dielectric 224 formed between the first and second conductors 222 and 226. In particular, when a frequency of a voltage applied to the capacitor element 220 (load voltage VL) resonates with a natural frequency of the multilayer ceramic capacitor and the frequency of the voltage is within an audio frequency band, acoustic noise may be generated. In addition, also when the frequency is outside the audio frequency band, the above vibration may apply stress around a substrate to which the capacitor element 220 is attached, and this may cause damage or physical malfunction. The electronic device 10 according to the disclosure includes the frequency booster circuit 300 and may prevent acoustic noise or physical malfunction by restraining resonance between a frequency of the load voltage VL and a natural frequency of the multilayer ceramic capacitor.

Figure 4A:
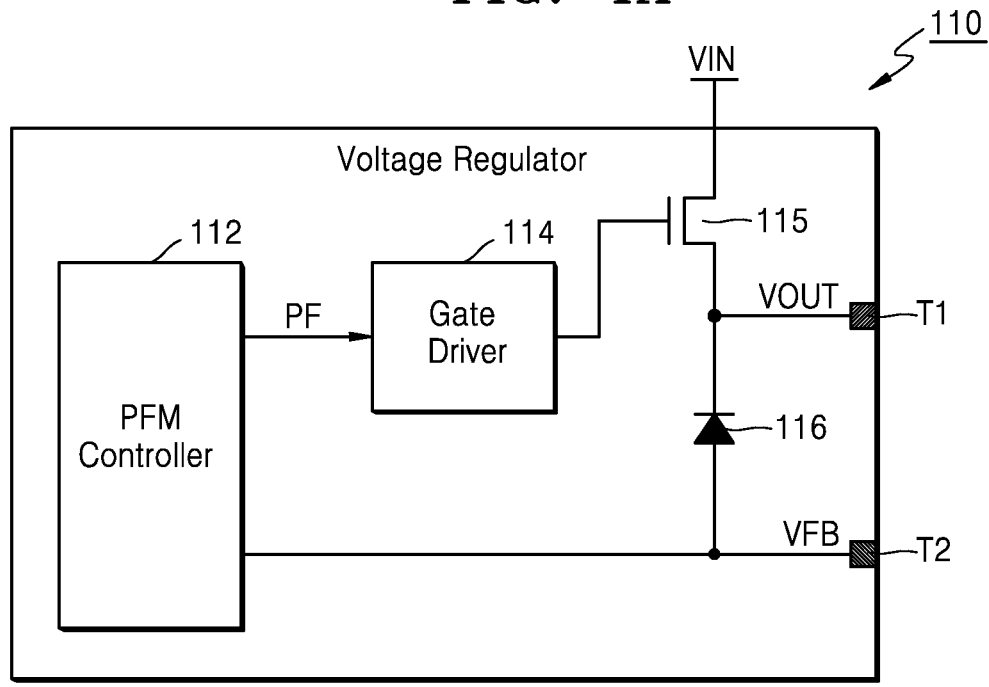
FIGS. 4A and 4B are diagrams illustrating a detailed structure of a voltage regulator, according to an embodiment of the disclosure.
Figure 4B:
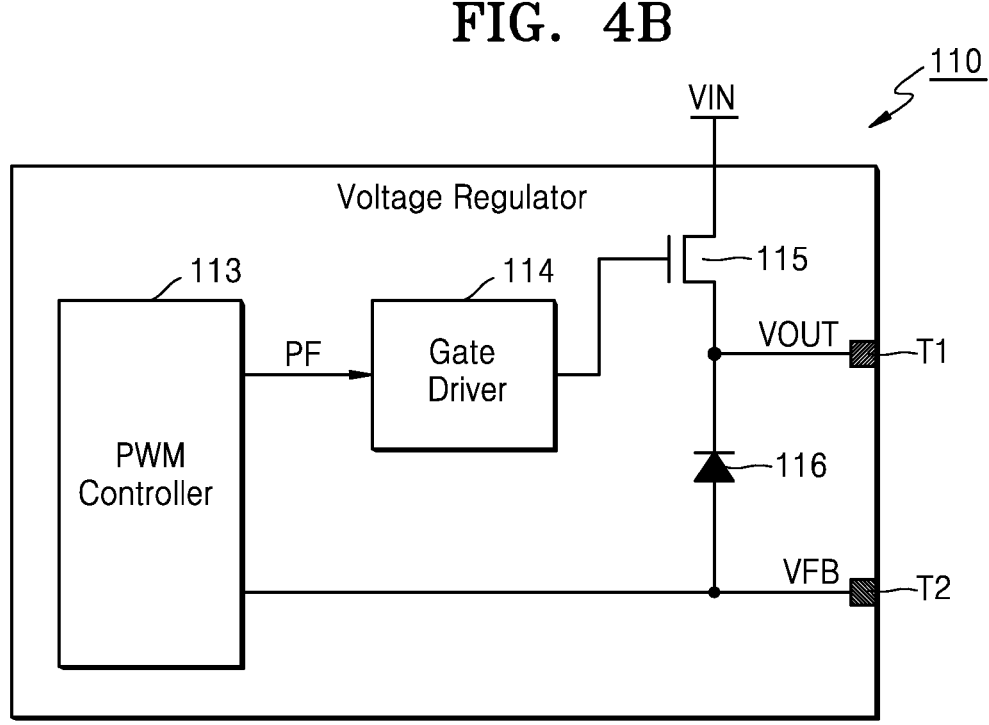

FIGS. 4A and 4B are diagrams illustrating a detailed structure of a voltage regulator 110, according to an embodiment of the disclosure.

Referring to FIG. 4A, the voltage regulator 110 may include a PFM controller 112, a gate driver 114, a switching device 115, and a diode 116. In the present embodiment, while the voltage regulator 110 is described as including the PFM controller 112 as a switching controller and as operating in a PFM manner, the disclosure is not limited thereto. Referring to FIG. 4B, the voltage regulator 110 may include a PWM controller 113 as a switching controller and operate in a PWM manner.

Referring back to FIG. 4A, the switching device 115 may have a first end (for example, a drain end) to which an input voltage VIN is provided, and a second end (for example, a source end) to which the diode 116 is connected. A gate end of the switching device 115 may be connected to the gate driver 114, and the switching device 115 may be turned on according to a gate voltage applied from the gate driver 114. As the switching device 115 is turned on, an output voltage VOUT may be provided through a first terminal T1.

The PFM controller 112 may receive a feedback voltage VFB through a second terminal T2. In an embodiment, the PFM controller 112 may output a pulse signal PF of a frequency adjusted based on a feedback voltage VFB to the gate driver 114. For example, when a current path is formed in the frequency booster circuit 300 according to the control by the frequency controller 130, the PFM controller 112 that has received information about the current path may output the pulse signal PF by slightly increasing a frequency of the pulse signal PF, the received information may be the feedback voltage VFB.

Figure 5:
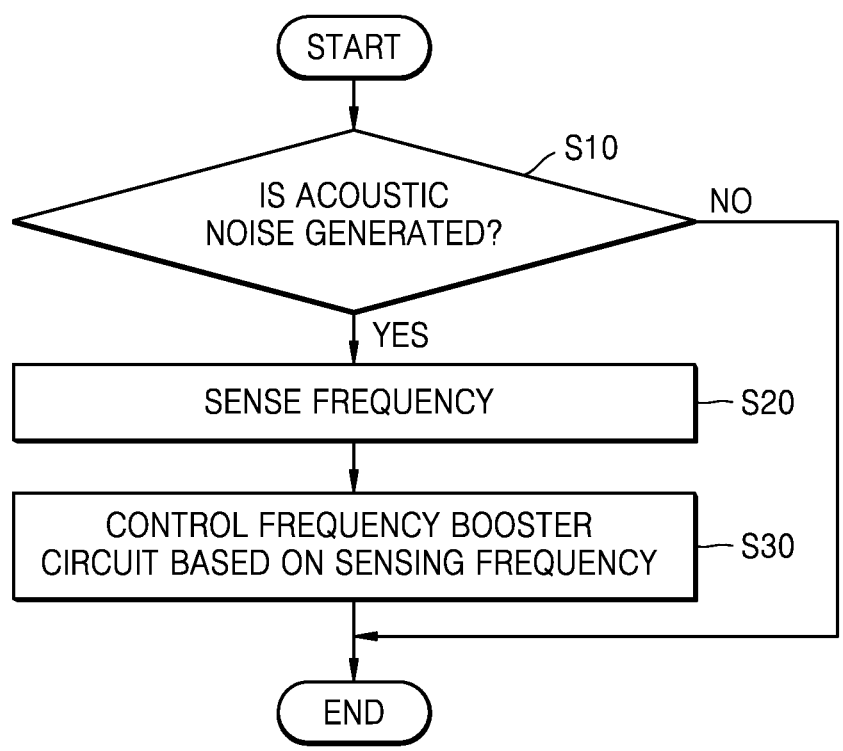
FIG. 5 is a flowchart of an operation of an electronic device, according to an embodiment of the disclosure.

FIG. 5 is a flowchart of an operation of the electronic device 10, according to an embodiment of the disclosure.

Referring to FIG. 5, whether acoustic noise is generated in the capacitor element 220 may be measured (S10). For example, the capacitor element 220 may include a multilayer ceramic capacitor and acoustic noise may be generated according to intrinsic piezoelectric characteristics of the multilayer ceramic capacitor. According to an embodiment, whether acoustic noise has occurred may be measured by using a measurement device included in the load device LD of the electronic device 10. The measurement device may be, for example, a processor that uses an application.

When acoustic noise generated in the capacitor element 220 is measured, a frequency of a load voltage VL applied to the load device LD may be sensed (S20). A frequency sensing operation of the load voltage VL may be performed using the frequency sensing circuit 120. According to an embodiment, in operation S10, the measurement device that has measured generation of acoustic noise may output an activated enable signal EN to the frequency sensing circuit 120. The frequency sensing circuit 120 may sense a frequency of the load voltage VL based on the enable signal EN and may generate frequency sensing information F_INF. The frequency sensing circuit 120 may output the frequency sensing information F_INF to the frequency controller 130.

Next, the frequency booster circuit 300 may be controlled based on a sensing frequency regarding the load voltage VL (S30). For example, the frequency booster circuit 300 may include a frequency booster switch 310 and a resistive element 320 and the frequency controller 130 may output a booster control signal CTRL_B based on the frequency sensing information F_INF to turn on the frequency booster switch 310. Accordingly, a current path connected to the first node NL may be formed and an equivalent load viewed from the first node NL may be increased. An increase in a current applied to the first node NL may be transmitted to the voltage regulator 110 as a feedback voltage VFB via a feedback path, and the voltage regulator 110 may vary a switching frequency to generate an output voltage VOUT. Accordingly, resonance between a frequency of the load voltage VL and a natural frequency of the multilayer ceramic capacitor may be prevented and acoustic noise may be attenuated.

Figure 6:
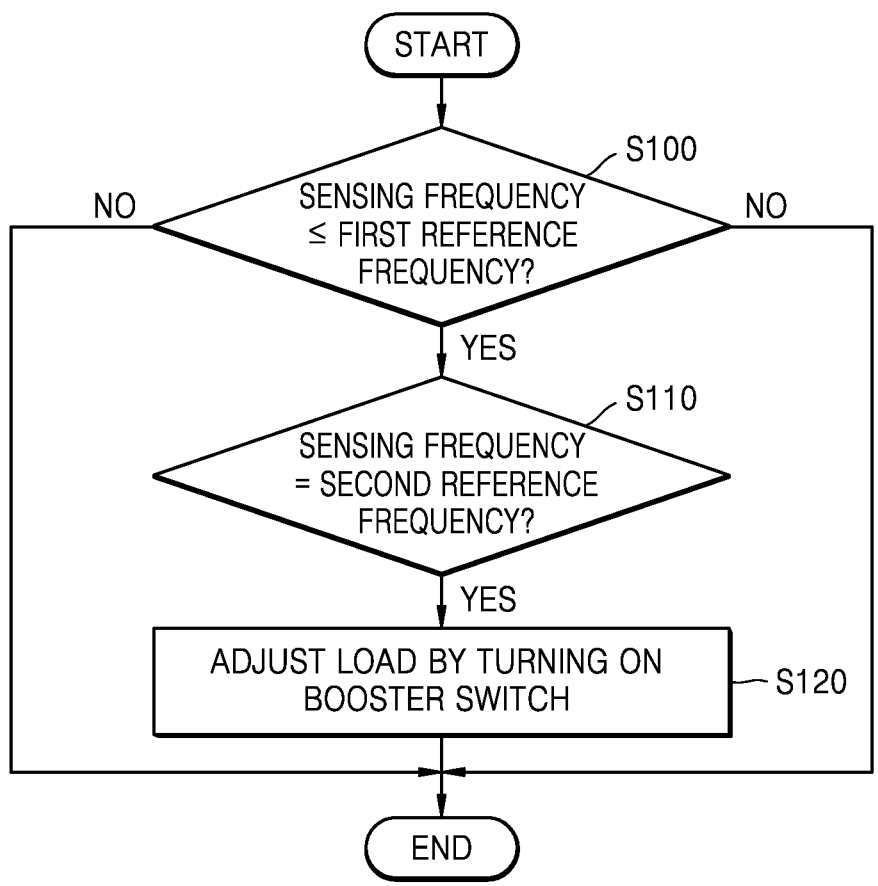
FIG. 6 is a flowchart of an example of a frequency control operation of a load voltage, according to an embodiment of the disclosure.

FIG. 6 is a flowchart of an example of a frequency control operation of a load voltage, according to an embodiment of the disclosure. FIG. 6 may be a flowchart of, for example, an operation of the frequency controller 130.

Referring to FIG. 6, whether a sensing frequency regarding a load voltage VL is equal to or less than a first reference frequency may be determined (S100). According to an embodiment, the frequency controller 130 may compare the sensing frequency regarding the load voltage VL with the first reference frequency based on frequency sensing information F_INF. The first reference frequency may be, for example, a maximum frequency in an audio frequency band (for example, 20 kHz). However, this is an example, and the first reference frequency may be set in various manners.

For example, when a sensing frequency is higher than an audio frequency band, a user may not perceive acoustic noise, and thus, the frequency controller 130 may not control the frequency booster circuit 300. In other words, when a sensing frequency is higher than an audio frequency band, the frequency booster circuit 300 may not generate an additional current path (or may turn off the frequency booster switch 310).

When a sensing frequency is equal to or lower than the first reference frequency, whether a sensing frequency regarding the load voltage VL is substantially equal to (or approximately equal to) a second reference frequency may be determined (S110). For example, the second reference frequency is a frequency equal to or lower than the first reference frequency and may be set in various manners. According to the present embodiment, for convenience of description, determining whether a sensing frequency is equal to one frequency, here, the second reference frequency, is described, but whether a sensing frequency is equal to a plurality of frequencies for control of a booster switch may also be determined.

As the need to attenuate acoustic noise is recognized, the frequency controller 130 may turn on the frequency booster switch 310 to adjust a load shown at the first node NL (S120). For example, the frequency controller 130 may output a booster control signal CTRL_B to the gate end of the frequency booster circuit 130 to form a current path including the resistive element 320 and the frequency booster switch 310. Accordingly, as an additional load current is further generated through the current path, the load shown at the first node NL may increase. As the information about the increased load is transmitted to the voltage regulator 110 by feedback, a frequency of the load voltage VL may be varied. For example, as an additional load current via the current path is further generated, a frequency of the load voltage VL may be slightly increased and resonance with a natural frequency of the multilayer ceramic capacitor may be prevented accordingly.

Figure 7:
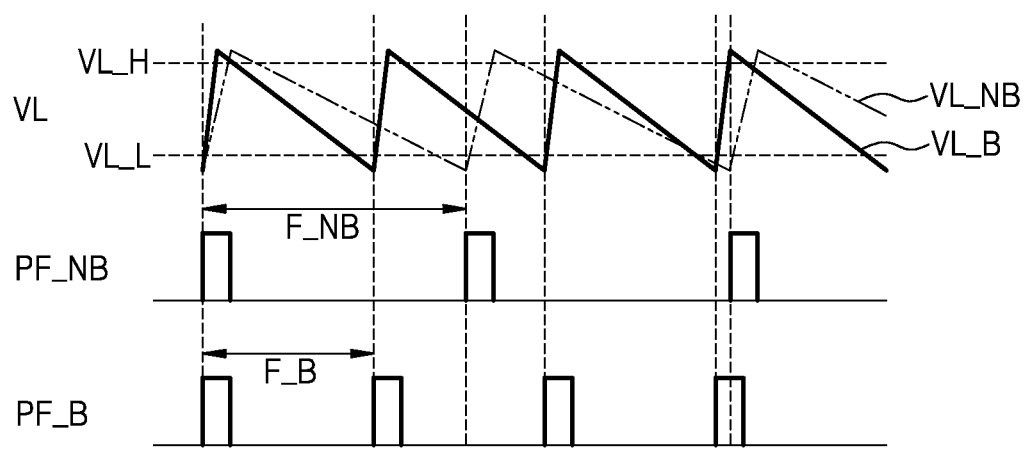
FIG. 7 is a timing diagram illustrating an example of frequency control according to an embodiment of the disclosure.

FIG. 7 is a timing diagram illustrating an example of frequency control according to an embodiment of the disclosure.

Referring to FIG. 7, before the frequency booster circuit 300 operates, the voltage regulator 110 may generate an output voltage VOUT based on a first frequency F_NB and the output voltage VOUT may pass by the stabilization circuit 200 to be output as a load voltage VL_NB. Before the frequency booster circuit 300 operates, the load voltage VL_NB may be charged to or discharged from the capacitor element 220 between a first level VL_H and a second level VL_L according to the first frequency F_NB. In other words, as a first pulse signal PF_NB having the first frequency F_NB is input, charging of the capacitor element 220 may be performed and as input of the first pulse signal PF_NB is interrupted, discharging of the capacitor element 220 may be performed.

According to an embodiment, when the first frequency F_NB resonates with a natural frequency of a multilayer ceramic capacitor, a current path may be formed in the frequency booster circuit 300 and the voltage regulator 110 may vary a switching frequency accordingly. For example, the PFM controller 112 included in the voltage regulator 110 may output a second pulse signal PF_B that is varied from the first frequency F_NB to a second frequency F_B. The second frequency F_B may be higher than the first frequency F_NB.

As the second pulse signal PF_B is output, after the frequency booster circuit 300 has operated, the load voltage VL_B may be charged to or discharged from the capacitor element 220 between a first level VL_H and a second level VL_L according to the second pulse signal PF_B. In other words, as the second pulse signal PF_B having the second frequency F_B is input, charging of the capacitor element 220 may be performed, and as input of the second pulse signal PF_B is interrupted, discharging of the capacitor element 220 may be performed.

Figure 8:
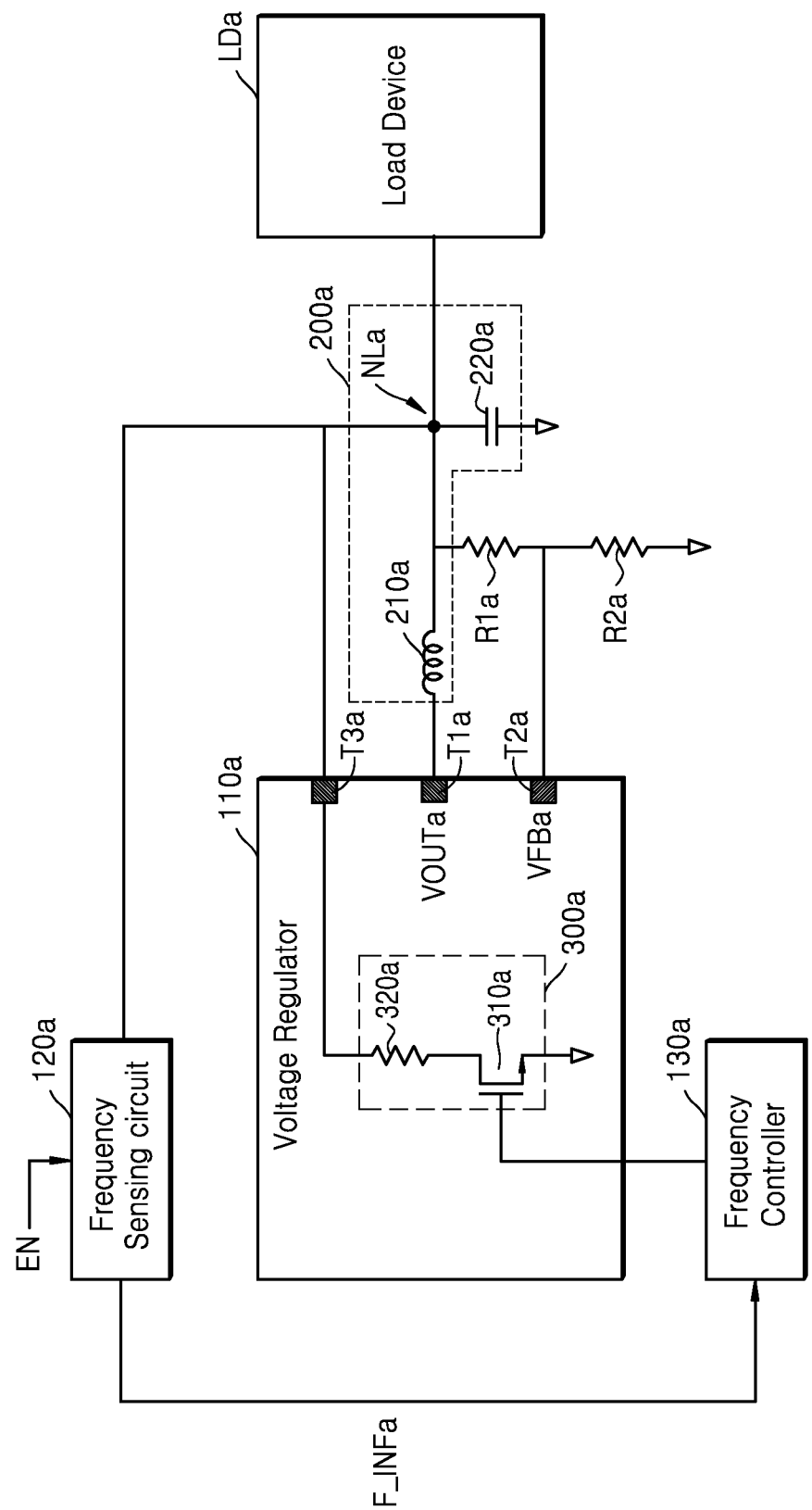
FIG. 8 is a diagram for describing an operation of an electronic device, according to another embodiment of the disclosure.

FIG. 8 is a diagram for describing an operation of an electronic device, according to another embodiment of the disclosure. Description of the components of the electronic device of FIG. 8, provided above with reference to FIG. 2, will be omitted.

Referring to FIG. 8, a voltage regulator 110a may provide an output voltage VOUTa through a first terminal T1a and a feedback voltage VFBa through a second terminal T2a. The first terminal T1a may be connected to a stabilization circuit 200a, and the second terminal T2a may be connected to a first end of a first resistor R1a and a first end of a second resistor R2a.

According to an embodiment, the voltage regulator 110a may be connected to a first node NLa via a third terminal T3a. For example, a capacitor element 220a, an inductor 210a, a first resistor R1a, a load device LDa, and a frequency sensing circuit 120a may be connected to the first node NLa. A load voltage VLa may be applied to the load device LDa via the first node NLa.

According to an embodiment, the voltage regulator 110a may further include a frequency booster circuit 300a. The frequency booster circuit 300a may be connected to the first node NLa via the third terminal T3a. According to an embodiment, the frequency booster circuit 300a may form a current path connected to the first node NLa, based on the control by a frequency controller 130a based on frequency sensing information F_INFa with respect to the load voltage VLa.

The frequency booster circuit 300a may include a frequency booster switch 310a and a resistive element 320a. The frequency booster switch 310a is a transistor having a first end to which ground is connected and a second end to which the resistive element 320a is connected, and the frequency controller 130a may be connected to a gate end of the frequency booster switch 310a. A first end of the resistive element 320a may be connected to the frequency booster switch 310a, and a second end of the resistive element 320a may be connected to the third terminal T3a.

As the frequency booster circuit 300a is included in the voltage regulator 110a, the voltage regulator 110a may directly boost a frequency of the load voltage VLa via the third terminal T3a. For example, when the capacitor element 220a includes a multilayer ceramic capacitor and a frequency of the load voltage VLa and a natural frequency of the multilayer ceramic capacitor resonate with each other, the voltage regulator 110a may increase a load shown at the first node NLa via the third terminal T3a and receive feedback about the load via the second terminal T2a. The voltage regulator 110a may output an output voltage VOUTa of a frequency varied according to the feedback, through the first terminal T1a.

Figure 9:
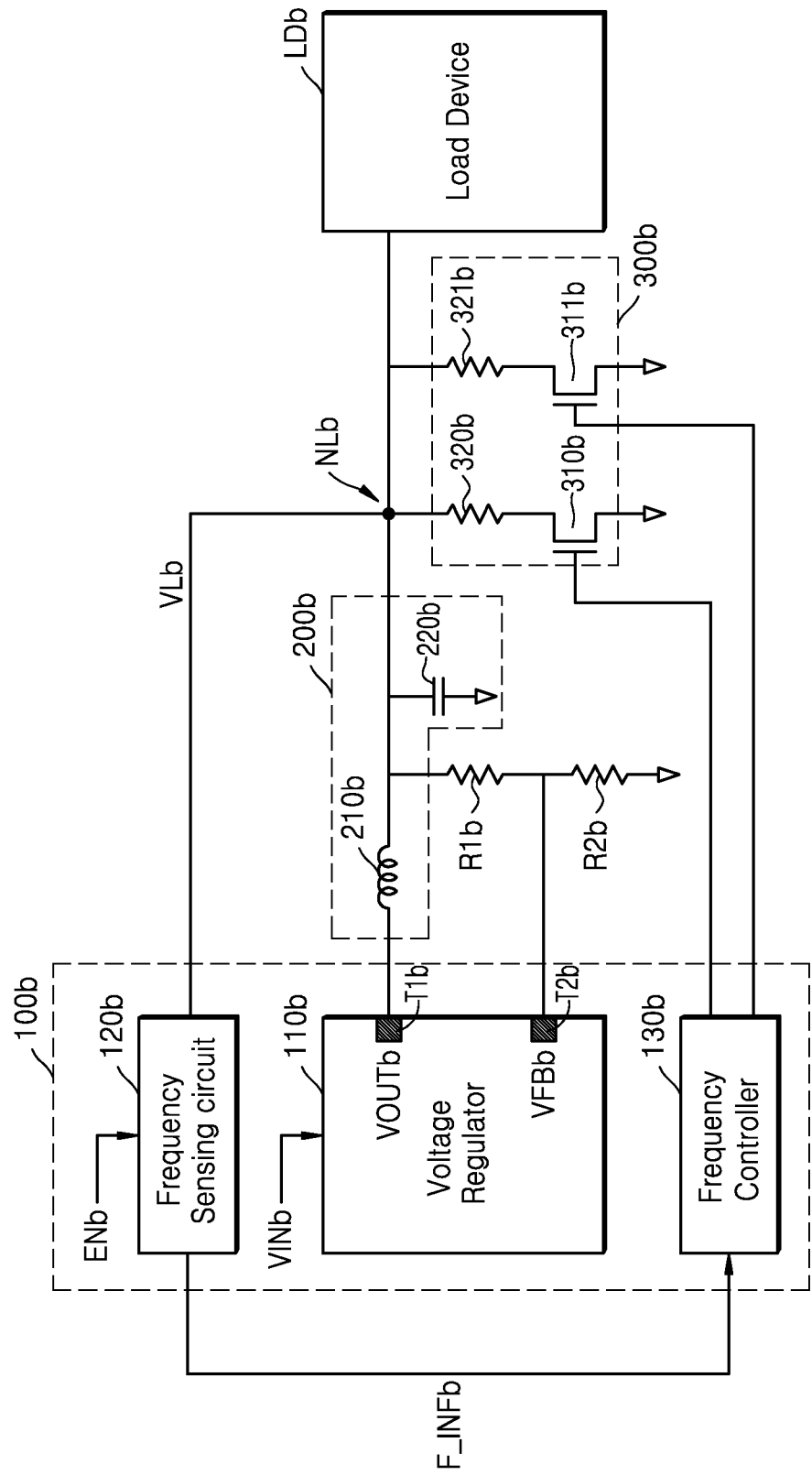
FIG. 9 is a diagram for describing an operation of an electronic device, according to another embodiment of the disclosure.

FIG. 9 is a diagram for describing an operation of an electronic device, according to another embodiment of the disclosure. Description of the components of the electronic device of FIG. 9 provided above with reference to FIG. 2 will be omitted.

Referring to FIG. 9, a frequency booster circuit 300b may include a first frequency booster switch 310b, a second frequency booster switch 311b, a first resistive element 320b, and a second resistive element 321b. According to an embodiment, the first frequency booster switch 310b and the first resistive element 320b may form a first current path connected to a first node NLb, based on the control by a frequency controller 130b. In addition, the second frequency booster switch 311b and the second resistive element 321b may form a second current path connected to the first node NLb, based on the control by the frequency controller 130b.

According to an embodiment, the frequency controller 130b may control turning on or off of each of the first frequency booster switch 310b and the second frequency booster switch 311b based on frequency sensing information F_INFb. For example, the frequency controller 130b may respectively turn on the first and second frequency booster switches 310b and 311b to form first and second current paths connected to the first node NLb. As another example, the frequency controller 130b may turn on the first frequency booster switch 310b and turn off the second frequency booster switch 311b to form a first current path connected to the first node NLb. As another example, the frequency controller 130b may turn off the first frequency booster switch 310b and turn on the second frequency booster switch 311b to form a second current path connected to the first node NLb.

As the frequency booster circuit 300b is configured to form a plurality of current paths, a frequency of a load voltage VLb may be finely boosted. For example, when a natural frequency of a multilayer ceramic capacitor includes a sum of a plurality of frequencies, a frequency sensing circuit 120b may sense the load voltage VLb and include the information about the sensed load voltage VLb in the frequency sensing information F_INFb and transmit the information to the frequency controller 130b. The frequency controller 130b may perform, based on frequency sensing information F_INFb, frequency boosting such that a frequency of the load voltage VLb is different from a plurality of frequencies constituting a natural frequency of the multilayer ceramic capacitor. To this end, the frequency controller 130b may select and control, from among combinations of multiple current paths, a combination whereby frequency boosting may be performed such that a frequency of the load voltage VLb is distinguished the most from the natural frequency of the multilayer ceramic capacitor. While the frequency booster circuit 300b configured to form two current paths is illustrated with respect to the present embodiment, this is merely for convenience of description, and the disclosure is not limited thereto.

Reference labels 100b, 110b, 200b, 210b, 220b, ENb, VINb, VOUTb, VFBb, T1b, T2b, R1b, R2b, and LDb within FIG. 9 correspond respectively to reference labels 100, 110, 200, 210, 220, EN, VIN, VOUT, VFB, T1, T2, R1, R2, and LD within FIG. 2.

Figure 10:
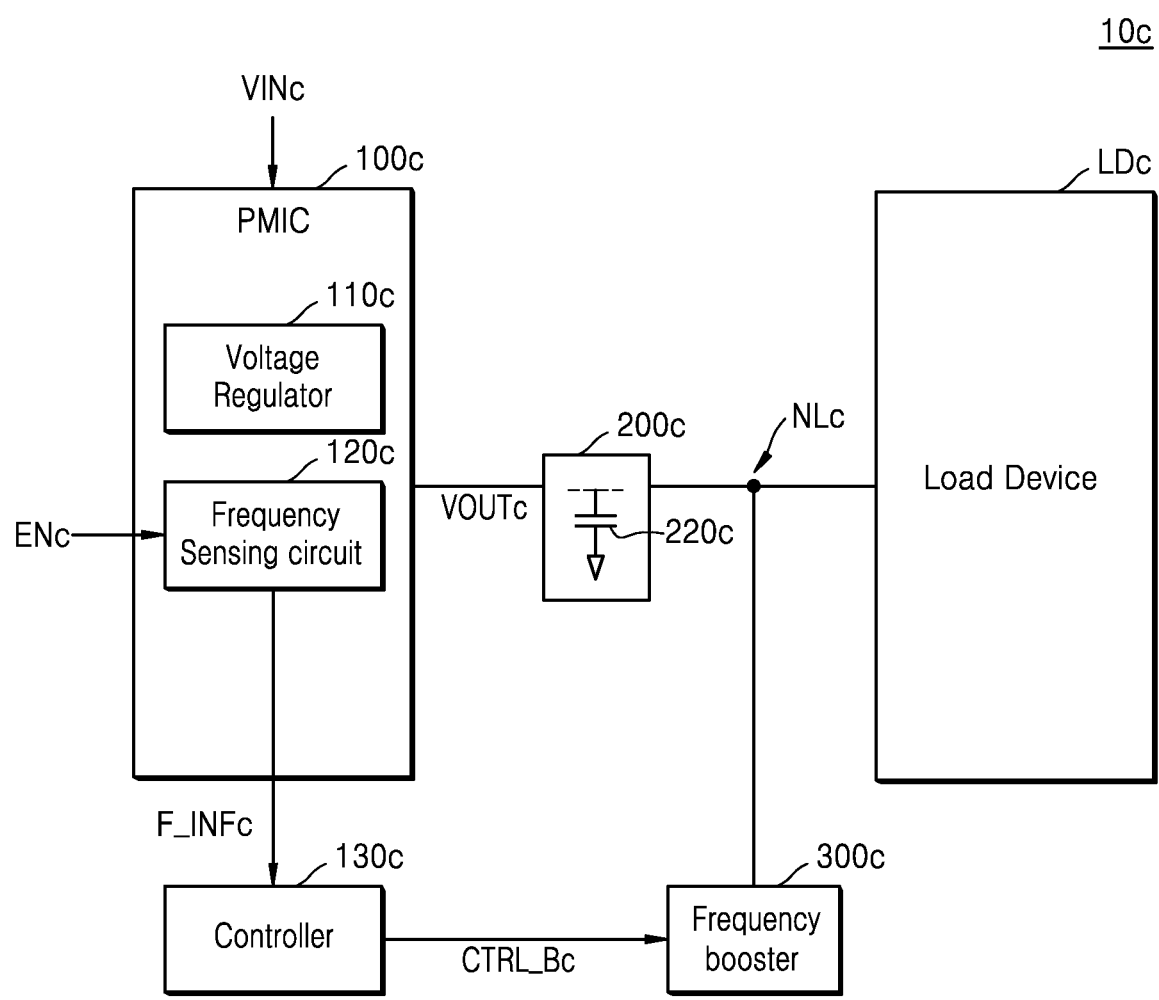
FIG. 10 is a block diagram illustrating an electronic device according to another embodiment of the disclosure.

FIG. 10 is a block diagram illustrating an electronic device 10c according to another embodiment of the disclosure. Description of the components of the electronic device 10c of FIG. 10 provided above with reference to FIG. 1 will be omitted.

Referring to FIG. 10, the electronic device 10c may include a PMIC 100c, a stabilization circuit 200c, a frequency booster circuit 300c, a load device LDc, and a controller 130c. The PMIC 100c may include a voltage regulator 110c and a frequency sensing circuit 120c. In addition, the stabilization circuit 200c may include a capacitor element 220c (for example, a multilayer ceramic capacitor).

The controller 130c may be configured to control an arbitrary functional block or an arbitrary device included in the load device LDc. For example, the load device LDc may include a memory device (not shown) and the controller 130c may be a memory controller controlling the memory device (not shown). However, this is an example and the disclosure is not limited thereto.

According to an embodiment, the controller 130c may receive frequency sensing information F_INFc generated via the frequency sensing circuit 120c, from the PMIC 100c, and control the frequency booster circuit 300c based on the frequency sensing information F_INFc. In detail, the controller 130c may output a booster control signal CTRL_Bc that is used to control the frequency booster circuit 300c, based on the frequency sensing information F_INFc. According to an embodiment, the frequency booster circuit 300c may form a current path connected to a first node NLc based on a booster control signal CTRL_Bc. For example, the frequency booster circuit 300c may include a resistive element connected to the first node NLc and a frequency booster switch connected to the resistive element. Turning-on and turning-off the frequency booster switch included in the frequency booster circuit 300c may be controlled based on the booster control signal CTRL_Bc output from the controller 130c.

Reference labels ENc, VINc, and VOUTc within FIG. 10 correspond respectively to reference labels EN, VIN, and VOUT within FIG. 2.

Figure 11:
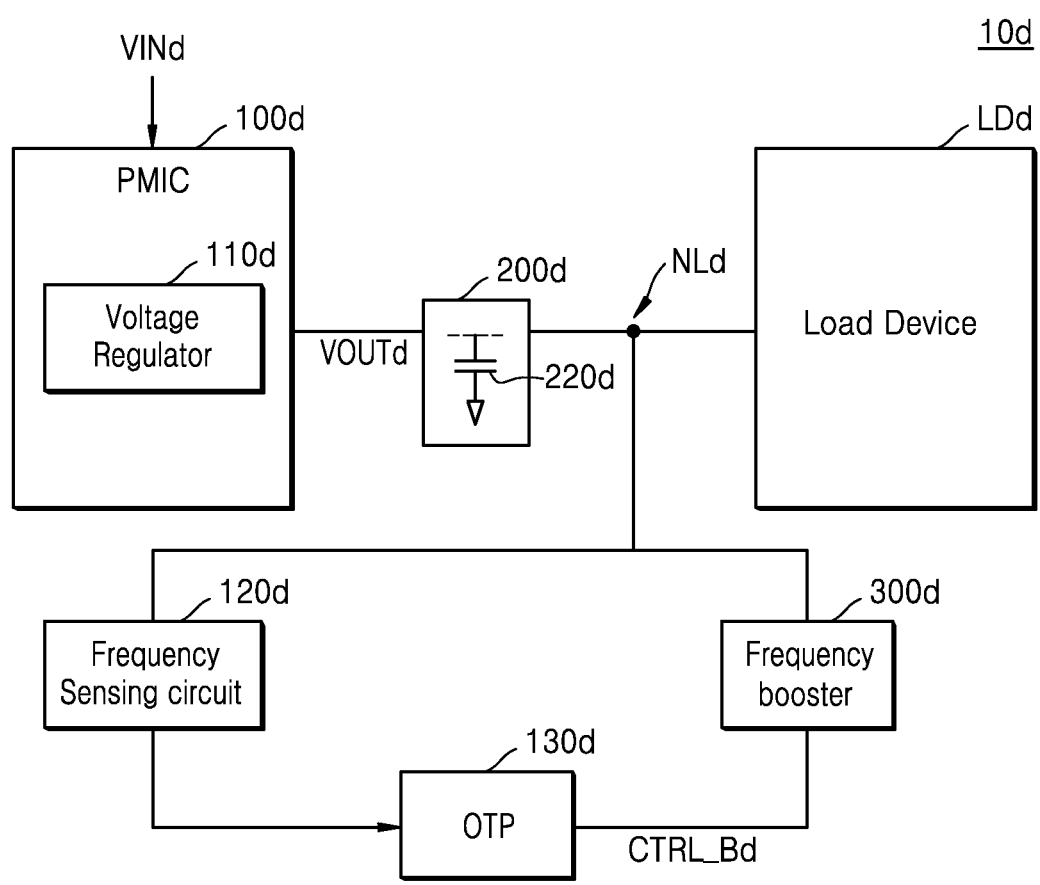
FIG. 11 is a block diagram illustrating an electronic device according to another embodiment of the disclosure.

FIG. 11 is a block diagram illustrating an electronic device 10d, according to another embodiment of the disclosure. Description of the components of the electronic device of FIG. 11 provided above with reference to FIG. 1 will be omitted.

Referring to FIG. 11, the electronic device 10d may include a PMIC 100d, a stabilization circuit 200d, a frequency booster circuit 300d, a load device LDd, a frequency sensing circuit 120d, and a one-time programmable (OTP) memory 130d. The PMIC 100d may include a voltage regulator 110d. In addition, the stabilization circuit 200d may include a capacitor element 220d (for example, a multilayer ceramic capacitor).

The frequency sensing circuit 120d may sense a frequency of a load voltage VLd applied to the load device LDd and may output frequency sensing information F_INFd according to the frequency of the load voltage VLd to the OTP memory 130d. For example, the frequency sensing information F_INFd output from the frequency sensing circuit 120d may be a basis for a setting value for the control of the frequency booster circuit 300d, which is to be stored in the OTP memory 130d.

According to an embodiment, the OTP memory 130d may store a setting value that is based on the frequency sensing information F_INFd. The setting value may be a basis for, for example, a booster control signal CTRL_Bd for the control of the frequency booster circuit 300d. For example, the OTP memory 130d may be a memory in which a structure of a memory cell which is a unit of data storage is varied irreversibly. Accordingly, a setting value that is stored in the OTP memory 130d based on the frequency sensing information F_INFd may not be changed once the setting value is written.

However, this is an example, and the disclosure is not limited thereto. As another example, the OTP memory 130d may be a non-volatile memory and may be replaced by electrically erasable programmable read-only Memory (EEPROM), a flash memory, phase change random access memory (PRAM), resistance random access memory (RRAM), a nano floating gate memory (NFGM), polymer random access memory (PoRAM), magnetic random access memory (MRAM), or ferroelectric random access memory (FRAM), or the like.

The frequency booster circuit 300d may be connected to a first node NLd and may operate based on a booster control signal CTRL_Bd output from the OTP memory 130d. According to an embodiment, the frequency booster circuit 300d may form a current path connected to the first node NLd based on a booster control signal CTRL_Bd. For example, the frequency booster circuit 300d may include a resistive element connected to the first node NLd and a frequency booster switch connected to the resistive element. Turning-on and turning-off of the frequency booster switch included in the frequency booster circuit 300d may be controlled based on the booster control signal CTRL_Bd output from the OTP memory 130d.

Reference label VINd within FIG. 11 corresponds to reference label VIN within FIG. 2.

Figure 12:
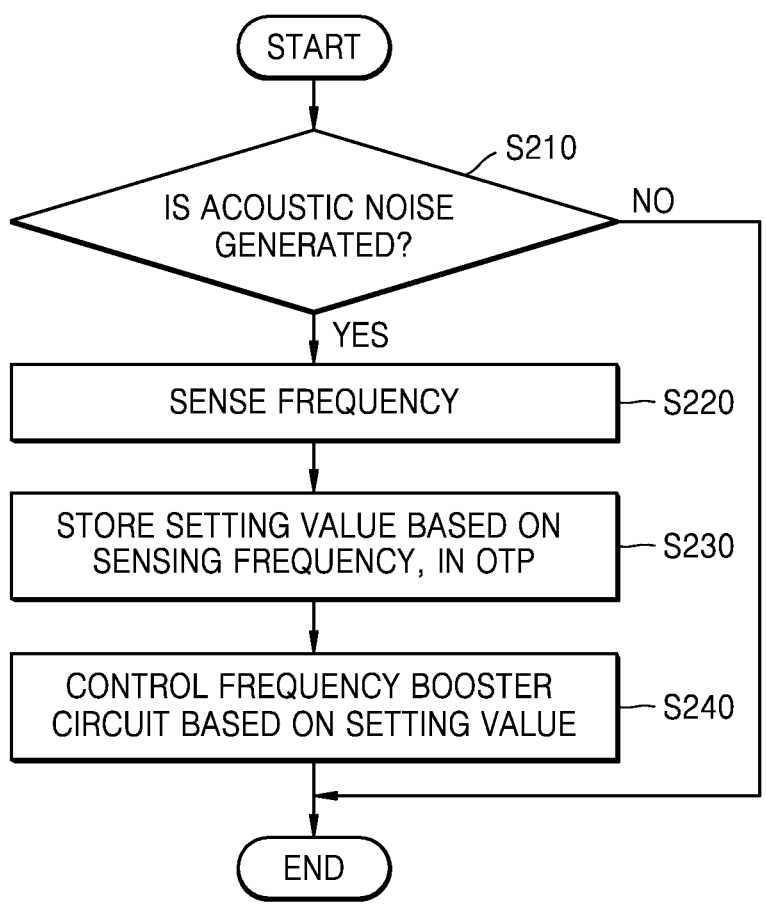
FIG. 12 is a flowchart of an operation of an electronic device, according to an embodiment of the disclosure.

FIG. 12 is a flowchart of an operation of an electronic device, according to an embodiment of the disclosure. Hereinafter, the embodiment of FIG. 12 will be described with reference to FIG. 11.

Referring to FIG. 12, whether acoustic noise is generated in the capacitor element 220d may be measured (S210). For example, the capacitor element 220d may include a multilayer ceramic capacitor and the multilayer ceramic capacitor may generate acoustic noise based on intrinsic piezoelectric characteristics of the multilayer ceramic capacitor. According to an embodiment, whether acoustic noise has occurred may be measured by using a measurement device included in the load device LDd of the electronic device 10d. The measurement device may be, for example, a processor that uses an application.

When acoustic noise generated in the capacitor element 220d is measured, a frequency of the load voltage VLd applied to the load device LDd may be sensed (S220). A frequency sensing operation of the load voltage VLd may be performed using the frequency sensing circuit 120d. The frequency sensing circuit 120d may output frequency sensing information F_INFd to the OTP memory 130d.

Next, a setting value based on a sensing frequency with respect to the load voltage VLd may be stored in the OTP memory 130d (S230). For example, the frequency sensing circuit 120d may output frequency sensing information F_INFd to the OTP memory 130d and the OTP memory 130d may write a setting value based on the frequency sensing information F_INFd. The setting value may be a basis for, for example, a booster control signal CTRL_Bd for the control of the frequency booster circuit 300d. Alternatively, a setting value may be the booster control signal CTRL_Bd.

Next, the frequency booster circuit 300d may be controlled based on the setting value stored in the OTP memory 130d (S240). The OTP memory 130d may output a booster control signal CTRL_Bd based on the setting value. For example, the frequency booster circuit 300d may include a frequency booster switch and a resistive element and the frequency booster switch may be turned on by receiving a booster control signal CTRL_Bd via a gate end of the frequency booster switch. Accordingly, a current path connected to the first node NLd may be formed and an equivalent load viewed from the first node NLd may be increased. For example, the voltage regulator 110d may receive information about an increase in an equivalent load by feedback and generate an output voltage VOUTd by varying a switching frequency based on the information.

Figure 13:
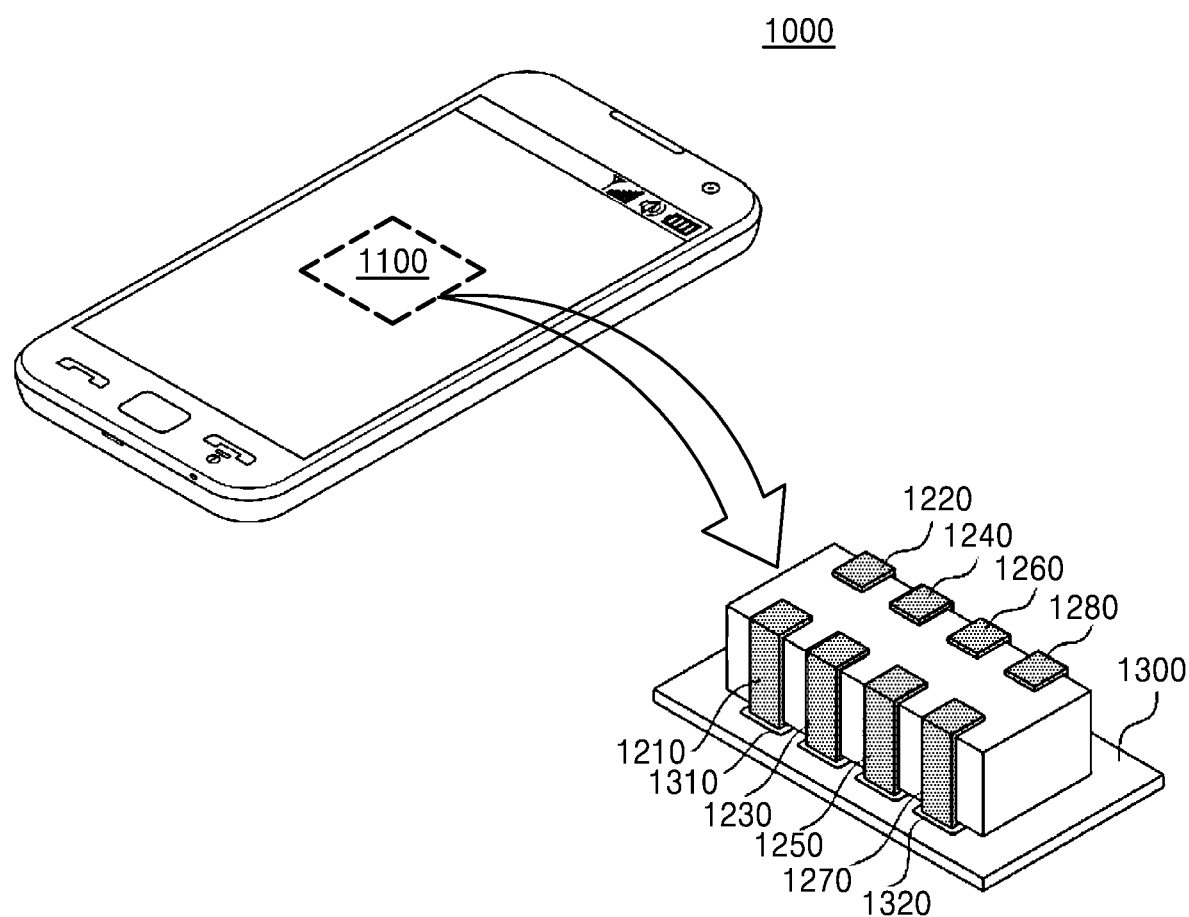
FIG. 13 is a schematic diagram illustrating a mobile device according to an embodiment of the disclosure.

FIG. 13 is a schematic diagram illustrating a mobile device 1000 according to an embodiment of the disclosure.

Referring to FIG. 13, the mobile device 1000 may include a package substrate 1100 mounted therein. For example, the package substrate 1100 may be a printed circuit board (PCB) or a flexible substrate. A chip or other electronic components may be mounted on the package substrate 1100. While the mobile device 1000 is illustrated to be a smartphone in FIG. 13, this is an example and the mobile device 1000 may also be a wearable device, a portable media player, a tablet PC, an e-book reader, or the like.

A multilayer ceramic capacitor 1300 may be mounted on the package substrate 1100. For example, the package substrate 1100 may include a plurality of electrode pads 1310 or 1320 and the multilayer ceramic capacitor 1300 may be electrically interconnected to each of the electrode pads 1310 or 1320 at positions where external electrodes 1210 through 1280 of the multilayer ceramic capacitor 1300 respectively correspond to the electrode pads 1310 or 1320. For example, the multilayer ceramic capacitor 1300 may be an array-type multilayer ceramic capacitor.

When the multilayer ceramic capacitor 1300 is included in a stabilization circuit connected to a PMIC, a voltage regulator, a frequency sensing circuit, a frequency controller, and a frequency booster circuit as those described with reference to FIGS. 1 through 12 may be included. Accordingly, resonance between a frequency of a load voltage and a natural frequency of a multilayer ceramic capacitor is prevented, thereby preventing acoustic noise and a physical malfunction of the package substrate 1100.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to exemplary embodiments thereof, it will be understood by those of ordinary skill in the art that various changes in form and details may be made therein without departing from the spirit and scope of the disclosure as defined by the following claims.

What is claimed is:

1. An electronic device comprising:
   a switching regulator configured to generate a conversion voltage with respect to an input voltage, based on a switching signal of a first frequency, and output the conversion voltage;
   a stabilization circuit comprising a capacitor element connected to a load device via a first node and configured to generate a load voltage, by stabilizing the conversion voltage using the capacitor element, and output the load voltage to the load device;
   a frequency sensing circuit configured to sense a frequency of the load voltage and output sensing information about the frequency of the load voltage; and
   a frequency booster circuit configured to form a first current path connected to the first node based on the sensing information.

2. The electronic device of claim 1, wherein the frequency booster circuit comprises a resistive element connected to the first node and a frequency booster switch connected to the resistive element.

3. The electronic device of claim 2, wherein turning-on or turning-off the frequency booster switch is controlled based on the sensing information to control a current of the first current path such that a natural frequency of the capacitor element is different from the frequency of the load voltage.

4. The electronic device of claim 3, further comprising a frequency controller that turns on the frequency booster switch if a frequency of the load voltage is within an audio frequency band.

5. The electronic device of claim 1, wherein the switching regulator further comprises a switching controller receiving a feedback voltage based on the load voltage and outputting the switching signal based on the feedback voltage.

6. The electronic device of claim 5, wherein the switching controller outputs the switching signal by varying the first frequency according to a current of the first current path.

7. The electronic device of claim 5, wherein the switching controller outputs a pulse signal of the first frequency as the switching signal based on a pulse frequency modulation (PFM) method.

8. The electronic device of claim 5, wherein the stabilization circuit further comprises an inductor having a first end connected to the switching regulator and a second end connected to the capacitor element.

9. The electronic device of claim 1, wherein the capacitor element comprises a multilayer ceramic capacitor.

10. The electronic device of claim 9, further comprising a measurement device configured to measure whether acoustic noise of the multilayer ceramic capacitor has occurred and output an enable signal to the frequency sensing circuit based on a result of the measurement.

11. The electronic device of claim 10, wherein the frequency sensing circuit senses a frequency of the load voltage according to the enable signal.

12. The electronic device of claim 1, wherein the frequency booster circuit additionally forms a second current path connected to the first node, based on the sensing information.

13. An electronic device comprising:
    a voltage regulator comprising a first terminal and a second terminal and configured to generate a switching signal, having a frequency that is variable based on a feedback voltage received via the second terminal, and an output voltage based on an input voltage;
    a stabilization circuit that is connected to the first terminal, comprises a multilayer ceramic capacitor, and is configured to output a load voltage to a first node by charging or discharging the output voltage to or from the multilayer ceramic capacitor; and
    a frequency booster circuit that is connected to the first node and comprises a frequency booster switch, wherein turning-on or turning-off the frequency booster switch is controlled based on a frequency of the load voltage.

14. The electronic device of claim 13, further comprising:
    a frequency sensing circuit configured to sense a frequency of the load voltage and output frequency sensing information; and
    a frequency controller configured to output a booster control signal used to control turning-on or turning-off the frequency booster switch based on the frequency sensing information.

15. The electronic device of claim 14, wherein the frequency controller outputs the booster control signal, based on the frequency sensing information, to turn on the frequency booster switch if a frequency of the load voltage and a natural frequency of the multilayer ceramic capacitor resonate with each other.

16. The electronic device of claim 14, wherein the frequency controller comprises a one-time programmable (OTP) memory storing a setting value for generating the booster control signal based on the frequency sensing information.

17. The electronic device of claim 13, further comprising:
    a first resistor having a first end connected to the first node and a second end connected to the second terminal; and
    a second resistor having a first end connected to the second terminal and a second end connected to ground, wherein
    the feedback voltage is formed by distributing the load voltage based on the first and second resistors.

18. The electronic device of claim 13, wherein the voltage regulator further comprises a pulse frequency modulation (PFM) controller outputting a pulse signal as the switching signal based on the feedback voltage, based on a PFM method.

19. The electronic device of claim 18, wherein the PFM controller increases a frequency of the switching signal as the frequency booster switch is turned on.

20. An electronic device comprising:
    a load device connected to a first node;
    a voltage regulator configured to generate a switching signal and generate an output voltage based on the switching signal and an input voltage;
    a multilayer ceramic capacitor having a first end connected to the first node, the multilayer ceramic capacitor being configured to generate a load voltage by being charged or discharged based on the output voltage;

a frequency controller configured to output a booster control signal based on a frequency of the load voltage; and
a frequency booster circuit connected to the first node and configured to form a first current path connected to the first node, based on the booster control signal.

* * * * *